US010929443B2

(12) United States Patent
Grochocki, Jr. et al.

(10) Patent No.: US 10,929,443 B2
(45) Date of Patent: Feb. 23, 2021

(54) LOCATION AND CONTEXT FOR COMPUTER FILE SYSTEM

(71) Applicant: Microsoft Technology Licensing, LLC, Redmond, WA (US)

(72) Inventors: David R. Grochocki, Jr., Seattle, WA (US); Jeff West, Sammamish, WA (US); Ana Lilia Otero Diaz, Woodinville, WA (US); Kshitij Sethi, Bellevue, WA (US); Elizabeth P. Salowitz, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 372 days.

(21) Appl. No.: 15/904,062

(22) Filed: Feb. 23, 2018

(65) Prior Publication Data

US 2019/0266260 A1 Aug. 29, 2019

(51) Int. Cl.
*G06F 16/00* (2019.01)
*G06F 16/29* (2019.01)
*G06F 9/54* (2006.01)
*G06F 16/13* (2019.01)
*G06F 16/182* (2019.01)
(Continued)

(52) U.S. Cl.
CPC ............ *G06F 16/29* (2019.01); *G06F 9/54* (2013.01); *G06F 16/13* (2019.01); *G06F 16/183* (2019.01); *G06F 16/909* (2019.01); *G06F 3/0484* (2013.01)

(58) Field of Classification Search
CPC .... G06F 16/2365; G06F 16/29; G06F 16/909; G06F 9/54; G06F 16/13; G06F 16/183; G06F 3/0484; G06F 16/1865
See application file for complete search history.

(56) References Cited

U.S. PATENT DOCUMENTS 6,023,744 A * 2/2000 Shoroff ............... G06F 3/0608
  707/999.202
6,061,688 A   5/2000 Kilpatrick et al.
7,945,852 B1  5/2011 Pilskalns
(Continued)

OTHER PUBLICATIONS

"Office Action Issued in European Patent Application No. 17715585.0", dated Jan. 13, 2020, 6 Pages.
"Annotating Maps", Retrieved from https://developer.apple.com/library/archive/documentation/UserExperience/Conceptual/LocationAwarenessPG/AnnotatingMaps/AnnotatingMaps.html, Retrieved on Mar. 9, 2016, 20 Pages.
(Continued)

*Primary Examiner* — Noosha Arjomandi
(74) *Attorney, Agent, or Firm* — Alleman Hall Creasman & Tuttle LLP (57) ABSTRACT

A computer file system includes a storage manager configured to allocate data storage space for a plurality of computer files having different filetypes. A location and context application programming interface (API) of the computer file system associates location and context metadata with any of the plurality of computer files regardless of filetype. The location and context metadata includes one or more filetype-agnostic geographic locations associated with the computer file, each of the one or more filetype-agnostic geographic locations having a shared predefined format assigned by the location and context API. The location and context metadata also includes, for each of the one or more filetype-agnostic geographic locations associated with the computer file, a location context describing a relationship between the filetype-agnostic geographic location and the computer file.

20 Claims, 7 Drawing Sheets (51) Int. Cl.
*G06F 16/909* (2019.01)
*G06F 3/0484* (2013.01)

(56) References Cited

U.S. PATENT DOCUMENTS

| | | | |
|---|---|---|---|
| 8,122,024 B2 | 2/2012 | Tysowski | |
| 8,185,601 B2 | 5/2012 | Rauhala et al. | |
| 8,443,077 B1* | 5/2013 | Lappas | G06F 3/065 709/224 |
| 8,749,585 B2 | 6/2014 | Kinnan et al. | |
| 2002/0156840 A1* | 10/2002 | Ulrich | G06F 16/10 709/203 |
| 2002/0156891 A1* | 10/2002 | Ulrich | G06F 16/10 709/225 |
| 2006/0058949 A1 | 3/2006 | Fogel et al. | |
| 2007/0260628 A1* | 11/2007 | Fuchs | G06F 16/29 |
| 2007/0288164 A1 | 12/2007 | Gordon et al. | |
| 2009/0132941 A1* | 5/2009 | Pilskalns | G06F 16/9537 715/764 |
| 2010/0241623 A1 | 9/2010 | Acker et al. | |
| 2011/0096091 A1 | 4/2011 | Milewski et al. | |
| 2011/0320114 A1 | 12/2011 | Buxton et al. | |
| 2012/0084643 A1* | 4/2012 | Govindan | G06F 40/151 715/255 |
| 2012/0124461 A1 | 5/2012 | Barnett et al. | |
| 2013/0225236 A1 | 8/2013 | Lee et al. | |
| 2013/0227236 A1* | 8/2013 | Flynn | G06F 3/061 711/165 |
| 2014/0089776 A1* | 3/2014 | Pilskalns | G06F 16/972 715/230 |
| 2014/0181089 A1* | 6/2014 | Desmond | G06F 16/5866 707/722 |
| 2014/0267796 A1 | 9/2014 | Jang et al. | |
| 2014/0365901 A1 | 12/2014 | Moha et al. | |
| 2015/0169524 A1* | 6/2015 | Dayan | G09B 29/003 715/201 |
| 2016/0342645 A1* | 11/2016 | Tempero | G06F 16/258 |
| 2017/0242871 A1* | 8/2017 | Kilaru | G06F 11/2097 |
| 2017/0262655 A1* | 9/2017 | Runkis | H04L 9/3213 |
| 2017/0277671 A1 | 9/2017 | Duggan et al. | |
| 2018/0107838 A1* | 4/2018 | Amarendran | G06F 21/6245 |
| 2018/0144524 A1* | 5/2018 | Lotto | G06Q 10/10 |
| 2019/0095422 A1* | 3/2019 | Chiang | G06F 40/35 |
| 2019/0179714 A1* | 6/2019 | Karthikeyan | G06F 3/0619 |
| 2019/0236394 A1* | 8/2019 | Price | G06K 9/4628 |
| 2020/0034049 A1* | 1/2020 | Bhattacharyya | G06F 3/067 |
| 2020/0089744 A1 | 3/2020 | Duggan et al. | |

OTHER PUBLICATIONS

"Map Marker", Retrieved from https://web.archive.org/web/20150610140213/https://play.google.com/store/apps/details?id=com.exlyo.mapmarker, Retrieved on Jun. 10, 2015, 2 Pages.

"Map Note", Retrieved from https://web.archive.org/web/20130516021844/https://play.google.com/store/apps/details?id=com.base2apps.mapnotes, Retrieved on May 16, 2013, 2 Pages.

"Photo Earth: Map & Geotag Pies", Retrieved from https://web.archive.org/web/20130829150334/https://play.google.com/store/apps/details?id=com.penguincape.photoearth, Retrieved on Aug. 29, 2013, 2 Pages.

"Unofficial Map for GTA 5", Retrieved from https://play.google.com/store/apps/details?id=com.tspoon.gta5.gta5map&hl=en, Retrieved on Mar. 9, 2016, 3 Pages.

"Non Final Office Action Issued in U.S. Appl. No. 15/176,066", dated Jun. 15, 2018, 32 Pages.

"International Search Report and Written Opinion Issued in PCT Application No. PCT/US17/023502", dated Jul. 12, 2017, 11 Pages.

Zhang, "Annotating and Navigating Tourist Videos", In Proceedings of 18th SIGSPATIAL International Conference on Advances in Geographic Information Systems, Nov. 2, 2010, pp. 260-269.

"International Search Report and Written Opinion Issued in PCT Application No. PCT/US19/017738", dated Apr. 3, 2019, 12 Pages.

Wang, et al., "Signaling of Location Metadata in File Formats", In International Organisation for Standardisation Organisation Internationale de Normalisation ISO/IEC JTC1/SC29/WG11 coding of moving pictures and audio—MPEG2003/M10124, Oct. 14, 2003, 2 Pages.

"Final Office Action Issued in U.S. Appl. No. 15/176,066", dated Jan. 14, 2019, 33 Pages.

* cited by examiner

| | 406A | 406B |
|---|---|---|
| FILE 1 402A | FILE CREATED: 45.511941, -122.625532  404A | REDEEMABLE AT: 45.541048, -122.615318  404B |
| FILE 2 402B | 406C LAST ACCESSED: 45.511039, -122.683210  404C | |
| FILE 3 402C | | |
| FILE 4 402D | 406D REDEEMABLE AT: 45.511941, -122.625532  404D | 45.508039, -122.697214  404E |

LOCATION AND CONTEXT FOR COMPUTER FILE SYSTEM

BACKGROUND

Computer file systems are used to access and organize digital files stored on a computer. Such file systems are often associated with specific operating systems.

Many computing devices can be used to access digital maps, which often provide manipulable representations of real-world environments. Such maps can be used to plan routes, find specific locations, follow step-by-step navigation directions, or visualize a current location of a computing device. Digital maps may additionally provide information specific to particular locations, buildings, or areas that are viewable on the map.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

A computer file system includes a storage manager configured to allocate data storage space for a plurality of computer files having different filetypes. A location and context application programming interface (API) of the computer file system associates location and context metadata with any of the plurality of computer files regardless of filetype. The location and context metadata includes one or more filetype-agnostic geographic locations associated with the computer file, each of the one or more filetype-agnostic geographic locations having a shared predefined format assigned by the location and context API. The location and context metadata also includes, for each of the one or more filetype-agnostic geographic locations associated with the computer file, a location context describing a relationship between the filetype-agnostic geographic location and the computer file.

DETAILED DESCRIPTION

With the portability of modern computing devices, it is possible to create, access, and modify computer files from almost anywhere in the world. Furthermore, in many cases, computer files may have particular relevance to one or more real- or virtual-world locations—e.g., a digital concert ticket is related to the concert's real-world venue, while a digital boarding pass for a flight is related to the airport from which the flight is departing.

Accordingly, the present disclosure describes a computer file system including a location and context application programming interface (API) configured to associate location and context metadata with computer files. The location and context metadata includes one or more filetype-agnostic geographic locations associated with a computer file, as well as one or more location contexts describing a relationship between the computer file and each of the one or more filetype-agnostic geographic locations. The API is configured to enforce a predetermined, shared metadata format that is used with different filetypes, thus allowing all files of the computing system to benefit from the enhanced location and context information. Via the location and context API, location and context metadata for computer files may be reported to a software application, allowing a computer file to be graphically represented on a graphical user interface (GUI) based on filetype-agnostic geographic locations of the computer file (e.g., the computer file is represented at one or more positions on a digital map). In this manner, a computer file's relevance to real- and/or virtual-world locations is easily exposed, which creates opportunities for new location-based functionality of a computing device.

The filetype-agnostic geographic format may describe real-world locations, virtual-world locations (e.g., virtual reality locations or video game locations), and/or any other suitable type of location. The filetype-agnostic geographic format often will define a two-dimensional (e.g., latitude and longitude) location, although one-, three- (e.g., including third dimension of elevation or subterranean depth), and even higher-dimension locations (e.g., including fourth dimension of time) may be used.

Figure 1:
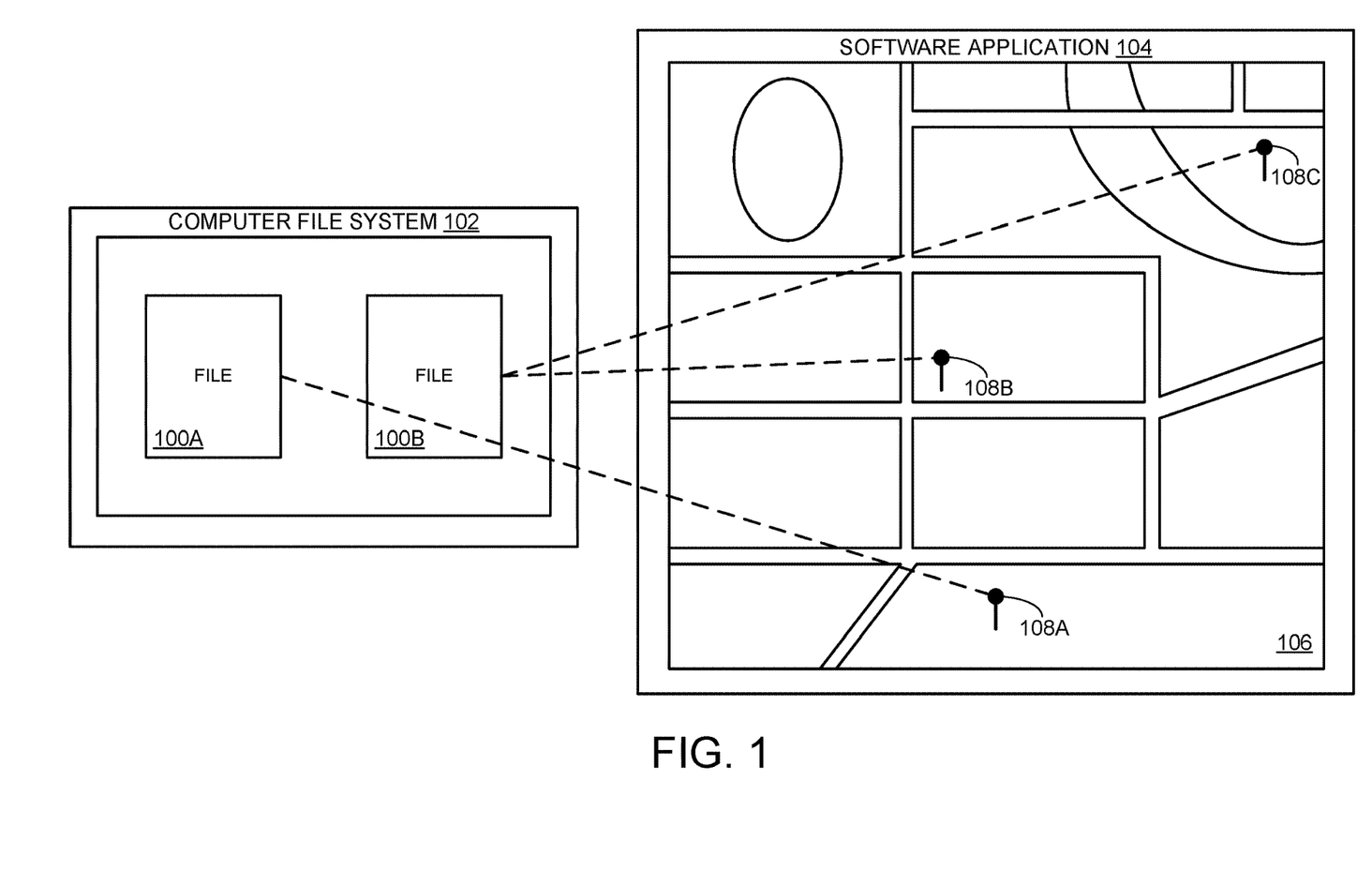
FIG. 1 schematically shows computer files associated with geographic locations on a graphical user interface (GUI) of a software application.

FIG. 1 schematically illustrates two example computer files 100A and 100B, each stored by a computer file system 102. Computer files 100A and 100B may be stored on any suitable computing device, having any suitable hardware configuration. For example, computer files 100A and 100B may be stored on a desktop computer, laptop computer, server, smartphone, tablet, wearable computing device, virtual/augmented computing device, etc. Computer files 100A and 100B need not be held on the same hardware storage medium, or even on the same computing device. In some examples, computer files 100A and 100B may be held on computing device 900, described below with respect to FIG. 9.

Computer files 100A and 100B may have any suitable filetype. As used herein, a file's "filetype" generally is used to distinguish computer files of different broad categories—e.g., a digital audio file will have a different filetype from a text document. The filetype is generally based on a encoding standard. As examples, computer files 100A and 100B may take the form of digital audio files, text documents, Portable Document Format (PDF) files, digital images, executable files, system files, contact entries (e.g., representing people), and/or any other suitable computer files. Files 100A and 100B may be encoded and/or compressed using any suitable codec or standard (a digital audio file may use the MP3 codec, the AC-3 codec, the FLAC codec, etc.), and may optionally use any suitable encryption. Furthermore, in many cases, computer files 100A and 100B will have different filetypes. For example, computer file 100A may be a digital audio file, while computer file 100B is a text document.

Computer files 100A and 100B are maintained by a computer file system 102. Though only two computer files are shown in FIG. 1, computer file system 102 may maintain any number of different computer files, which may be organized into any suitable number of folders or directories and may be distributed across any suitable number of hardware storage machines. As examples, computer file system 102 may be implemented as an NTFS file system, FAT, exFAT, HFS Plus, EXT, etc., or any other suitable file system. In some implementations, the computer file system may include a cloud storage file system useable to store computer data on one or more remotely-located storage devices.

FIG. 1 also shows a software application 104, taking the form of a digital map application. Software application 104 is displaying a graphical user interface (GUI) including digital map 106 representing a real-world environment. As shown, computer files 100A and 100B are each represented on digital map 106 at various locations 108. Specifically, computer file 100A is represented at map location 108A, while computer file 100B is represented at map locations 108B and 108C. These map locations correspond to filetype-agnostic geographic locations specified by location and context metadata of computer files 100A and 100B, as will be described in more detail below.

Software application 104 is a nonlimiting example of software applications that may take advantage of the location and context metadata provided by the file system 102. A digital map displayed by a software application may represent any suitable real- or virtual-world location having any suitable scale. Furthermore, a GUI displayed by a software application need not include a digital map. Rather, in some examples, a software application may use location and context metadata to graphically represent computer files according to other suitable paradigms—for example, each location associated with a computer file may be represented by a separate page of a notetaking application. Software application 104 may graphically represent any number of computer files, and each computer file may be associated with any number of filetype-agnostic geographic locations.

Figure 2:
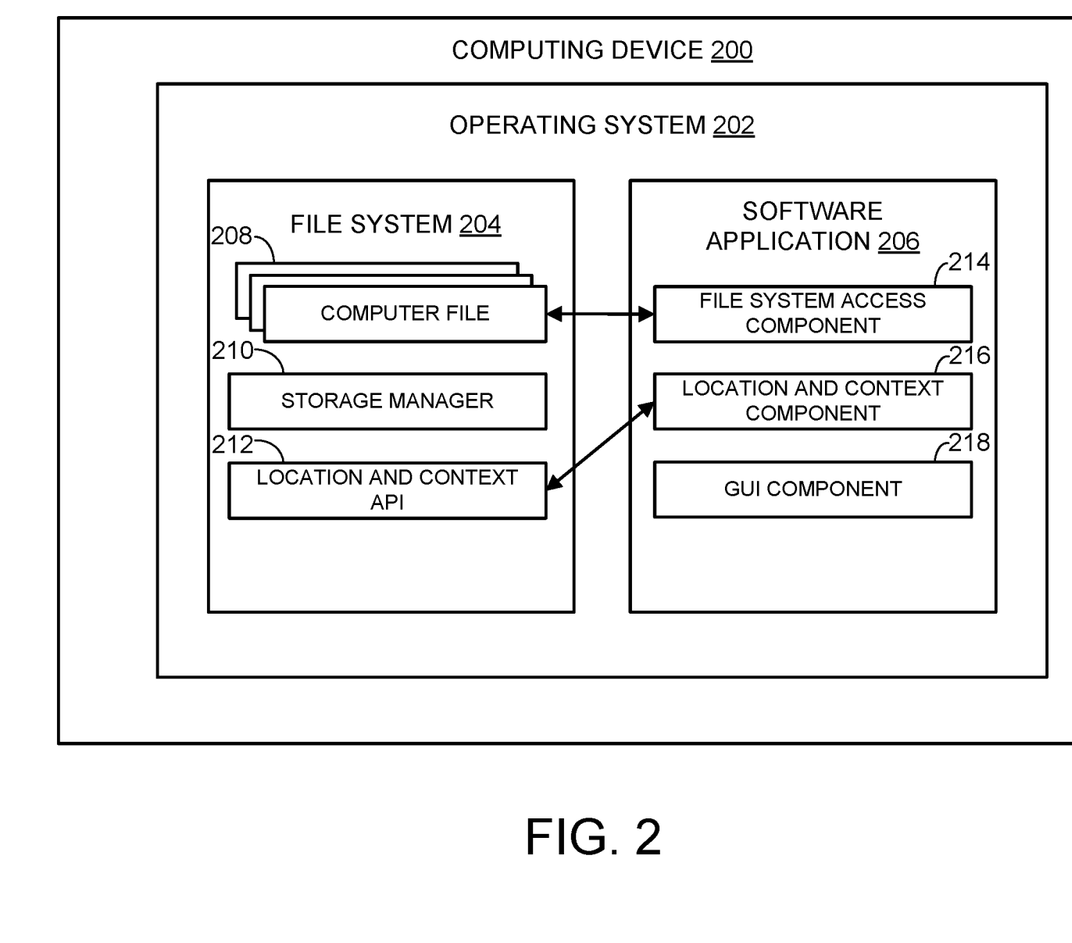
FIG. 2 schematically shows an example computing device.

FIG. 2 schematically shows an example computing device 200 configured to associate computer files with geographic locations. Computing device 200 includes an operating system 202, which may be any suitable computer operating system configured to manage hardware and software resources of the computing device. With regard to hardware resources, as discussed above, computing device 200 may have any suitable hardware configuration, depending on the implementation. In some examples, computing device 200 may be implemented as computing system 900 described below with respect to FIG. 9.

Computing device 200 may include any number of software resources, including operating system components, management utilities, applications, etc. As shown, computing device 200 includes a computer file system 204 and at least one software application 206. File system 204 manages storage of a plurality of computer files 208. As discussed above, such computer files may have any suitable filetype, and typically a variety of different filetypes will be represented.

A storage manager 210 of the computer file system allocates data storage space of the computing device for the plurality of computer files. The specifics of this process will vary depending on the specific computer file system and hardware storage media used. For example, traditional hard drives typically include a plurality of blocks divided between a plurality of metallic platters. Data is stored in the blocks via an encoding scheme that involves differential magnetization of the platters. In this case, the storage manager of the computer file system will likely allocate some number of blocks of the hard drive for each computer file and maintain a record of which blocks correspond to which computer files (e.g., a master file table of the NTFS file system). However, when other file systems and/or storage media are used, storage space for computer files may be allocated in other suitable ways.

Computer file system 204 also includes a location and context application programming interface (API) 212 configured to associate location and context metadata with any of the plurality of computer files. Notably, the location and context API 212 can associate location and context metadata with any of the computer files, regardless of file type. In other words, location and context metadata having substantially the same format may be associated with digital audio files, text documents, executable files, images, etc., which allows any of the plurality of computer files to be associated with geographic locations, regardless of filetype. Furthermore, location and context API 212 is configured to constrain the format of the location metadata to a shared predefined format that is enforced across all filetypes. In some implementations, the shared predefined format may accommodate different sub-formats. For example, a latitude longitude sub-format, an address sub-format, or business name sub-format. In such cases, each sub-format may have specific enforced attributes so each sub-format is useable by all applications and/or services taking advantage of the API. By dictating the format with which the geographic locations are saved for all filetypes, compatibility across all applications can be ensured. Furthermore, because API 212 provides a mechanism for any application to take advantage of rich location and context functionality, the individual developer of any particular application is not responsible for developing such functionality from the ground up. Instead, the developer may utilize the API 212 to assign location and context metadata using predetermined API operations. Furthermore, the location and context API 212 includes operations for accessing the saved metadata. Therefore, all applications can utilize the same API calls to take advantage of the location and context metadata with little developer effort.

In general, the location and context API may take any suitable form, provided it enables association of computer files with location and context metadata with the shared predefined format, and allows access to such metadata by software applications of the computing device. In some cases, functions of the location and context API may be performed by a generalized file system API or file metadata API that also provides other functions. In other cases, the location and context API may be a specialized component that only performs location-related functions. In some implementations, at least a portion of the location and context API may be implemented as a cloud storage API useable to store data on one or more remote storage devices.

Computer file system 204 is configured to provide access to the plurality of computer files to software application 206. Specifically, software application 206 includes a file system access component 214, configured to access any or all of the plurality of computer files. To use the example of FIG. 1, software application 104 includes a file system access component configured to access first and second computer files 100A and 100B. Furthermore, the location and context API of the file system is configured to report the location and context metadata for any particular computer file to the software application. Specifically, the location and context metadata is provided to a location and context component of the software application, which is configured to retrieve, via the location and context API of the file system, location and context metadata for any or all of the plurality of computer files. Because API 212 enforces a consistent shared format for the location and context metadata, location and context component 216 is guaranteed to retrieve useable information in an expected format.

Software application 206 also includes a graphical user interface (GUI) component configured to represent computer files accessed by the file system access component on a GUI rendered by the software application. For example, as shown in FIG. 1, the GUI may include a digital map, with the computer files being represented at geographic locations associated with the computer files. However, the GUI rendered by the software application may take any suitable form. As discussed above, in some examples, computer files may be represented as "pages" of a notetaking application, with pages being sorted into a hierarchy based on geographic location. As an example, computer files associated with the same town may be assigned pages that are sorted into the same "town" section, while towns in the same state may be sorted into the same "state" section, and so on. In this manner, computer files may still be represented on a GUI based on geographic locations associated with the computer files, even if the GUI does not include a digital map.

Figure 3:
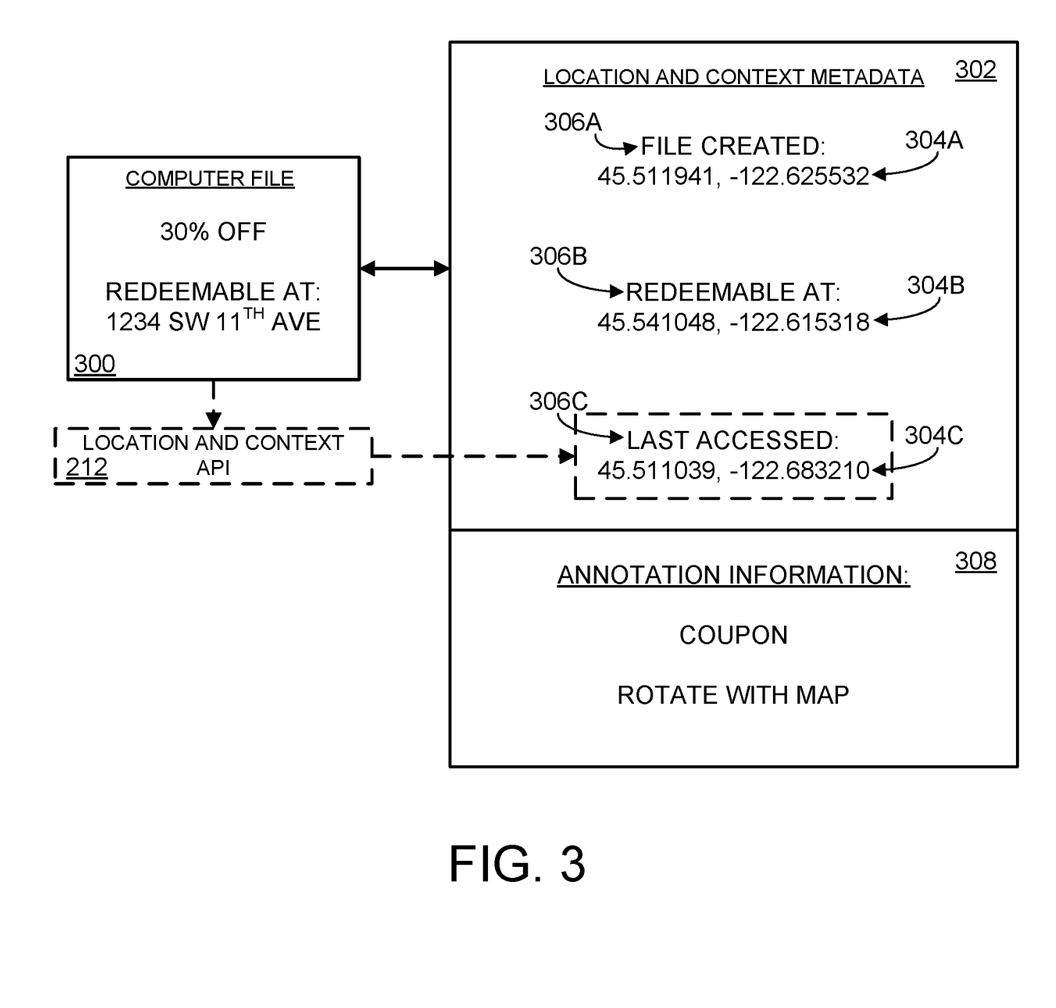
FIG. 3 schematically shows location and context metadata associated with a computer file.

FIG. 3 schematically illustrates association of location and context metadata with a computer file. As shown, a computer file 300 is associated with location and context metadata 302 by location and context API 212 of computer file system 204. In the illustrated example, computer file 300 is redeemable for a product or service (e.g., a discount on a purchase) at a specific real-world location (e.g., a business that accepts a digital coupon). Computer file 300 may take any suitable form—e.g., a text document, a PDF, a digital image file, or a cryptographic key, and may be one of the plurality of computer files 208 maintained by file system 204 of computing device 200.

Location and context metadata for a computer file includes one or more filetype-agnostic geographic locations associated with the computer file and typically, for each of the one or more filetype-agnostic geographic locations, a location context describing a relationship between the filetype-agnostic geographic location and the computer file. In other words, the location context of a particular geographic location describes the significance of the geographic location to the computer file. In the example of FIG. 3, location and context metadata 302 includes three filetype-agnostic geographic locations 304A-304C. Furthermore, each of these filetype-agnostic geographic locations includes a location context, labeled as 306A-306C. Location context 306A specifies that geographic location 304A corresponds to the real-world location at which the computer file was created. Similarly, location context 306B indicates that geographic location 304B corresponds to the real-world location at which the coupon (i.e., computer file 300) can be redeemed, while location context 306C indicates that geographic location 304C corresponds to the location at which the computer file was last accessed.

Filetype-agnostic geographic locations associated with a computer file need not have an associated location context. Rather, a computer file may have any number of associated geographic locations that lack a location context. In such cases, the context-free geographic locations may be interpreted as "default" or "generic" geographic location. How such geographic locations are handled by software applications will vary from situation to situation. In one scenario, upon accessing a computer file that has one or more context-free geographic locations, a software application may be configured to assume that the geographic locations are relevant, and automatically represent such locations on a GUI (e.g., digital map). In other cases, the software application may be configured to ignore any filetype-agnostic geographic locations that do not have associated location contexts, and/or otherwise treat such geographic locations differently from other geographic locations that have location contexts.

Notably, each of the filetype-agnostic geographic locations shown in FIG. 3 have a shared format, and in this example are expressed as Latitude and Longitude coordinates. In other examples, the filetype-agnostic geographic locations may have a different suitable format. Each of the filetype-agnostic geographic locations uses the same predefined format, as enforced by the location and context API of the computer file system. This has the benefit of maintaining uniformity across the plurality of computer files of the computing device. Furthermore, it facilitates cooperation between the software application and the file system, as the software application can interpret the shared predefined format of the filetype-agnostic geographic locations to graphically represent any of the computer files on a GUI (e.g., digital map).

FIG. 3 shows three different examples of location contexts, though any number of different location contexts may be supported depending on the type of computer file. For example, a digital audio file (e.g., song) may be associated with filetype-agnostic geographic locations corresponding to the location where the file was created, the location of the studio at which the song was recorded, the hometown of the recording artist, tour locations for the recording artist, locations where an album including the song may be purchased, locations where tickets may be purchased, a location where the audio file was last accessed or played, etc. A similarly wide variety of location contexts may be supported for computer files having other filetypes.

In some cases, the computer file system may maintain a list of all possible location contexts, which can help to ensure that location contexts are used consistently across computer files generated or modified by different software applications. In some implementations, the API may ensure that all contexts are selected from a predetermined menu of possible contexts. Additionally, or alternatively, software applications/file creators may specify their own custom location contexts. In some implementations, the API may be configured to support free-form contexts that do not adhere to a predetermined format.

The specific information included in location and context metadata for a particular computer file may have any suitable source and be provided by any suitable party. For example, the creator of a computer file may provide some or all of the location and context metadata for the computer file. Using the example of a digital song, the song's publisher or distributor may provide, along with the song, filetype-agnostic geographic locations, as well as location contexts, associated with the song.

Additionally, or alternatively, the location and context metadata for a computer file may be generated by a software application on the computing device, and/or by the file system itself. For example, upon using a multimedia application to play the digital song, the multimedia application may, via the location and context API, associate the computing device's current location with the digital song, with a location context specifying that the location corresponds to the last place the song was played. Upon opening a text document, a text editor may automatically scan contents of the text document and associate the text document with any locations referenced by the text document's contents (e.g., a business address may be identified in a digital receipt, or a mailing address may be identified in a digital business card). In some cases, a software application may be configured to identify filetype-agnostic geographic locations for a computer file by searching the Internet—for example, to find locations where a particular product is in stock, or theaters where a particular movie is playing. Similarly, some locations may be associated with a computer file by the file system itself, for example when the computer file is first created, or when the computer file is modified by a software application that does not support location and context metadata.

Location and context metadata for a computer file may be added or modified at any suitable time. For example, location and context metadata may be added or modified when a computer file is created, when the computer file is edited, when the computer file is opened by a software application, when the computing device is turned on, when the computing device is idle, etc. Location and context metadata may be updated or refreshed for all computer files at once, or only a subset of the computer files (e.g., those that have been modified recently).

FIG. 3 illustrates modification of location and context metadata for a computer file. As shown, location and context API 212 has modified the filetype-agnostic geographic locations associated with computer file 300. This may be done, for example, in response to receiving instruction from the location and context component of the software application, or in response to another suitable trigger. In the example of FIG. 3, modifying the filetype-agnostic geographic locations of the computer file includes associating an additional filetype-agnostic geographic location with the computer file (i.e., filetype-agnostic geographic location 304C), which in this case corresponds to a real-world location at which the first computer file was accessed. As discussed above, however, location and context metadata for a computer file may be added, removed, or otherwise modified in any suitable way, and at any suitable time.

In some examples, the location and context metadata for a computer file may include annotation information specifying how the computer file should be represented on a digital map. In such examples, the location and context component of the software application may be configured to retrieve annotation information for any or all of the computer files from the location and context API, and graphically represent the computer files on the GUI based on the information specified by the annotation information.

Example annotation information 308 is shown in FIG. 3 as part of location and context metadata 302. Annotation information may take any suitable form, and may include any suitable parameters or variables defining how computer files should be represented. In the illustrated example, annotation information 308 specifies that the computer file is a coupon and should rotate with the map. Specifying that the computer file is a coupon may, for instance, affect the icon used to represent the computer file, how the computer file behaves when selected by a user, at which filetype-agnostic geographic locations the computer file should be shown under what circumstances, etc. Similarly, specifying that the computer file should rotate with the map means that the computer file's representation on the digital map should rotate as the map does, such that the representation is always right-side up. This differs from other file representations, which may benefit from maintaining a map-locked orientation as the digital map rotates. In other examples, additional or alternative annotation information may be used, which may affect graphical representation of computer files in any suitable way.

Figure 4:
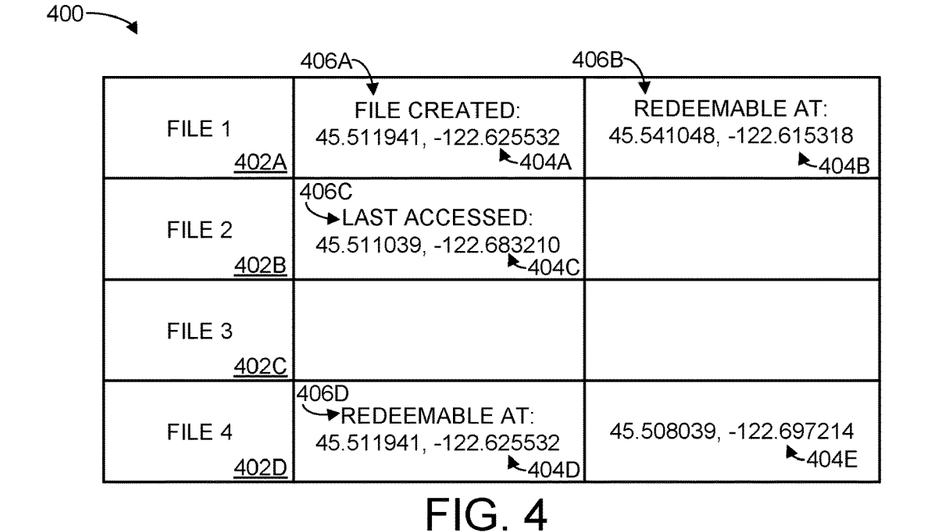
FIG. 4 schematically shows location and context metadata stored in a table maintained by a computer file system.
Figure 5:
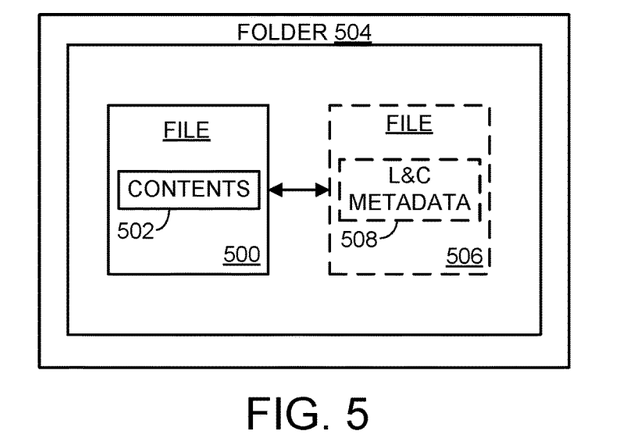
FIG. 5 schematically shows location and context metadata of a computer file stored in a separate file associated with the computer file.
Figure 6:
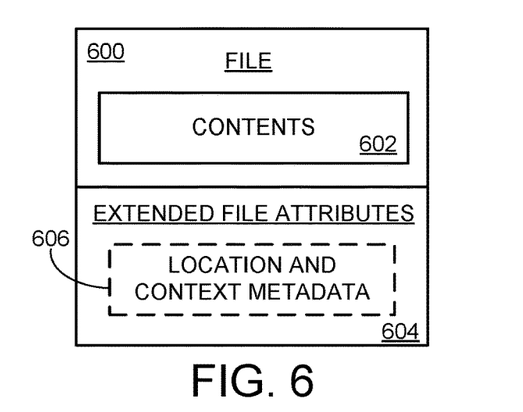
FIG. 6 schematically shows location and context metadata of a computer file specified by extended file attributes of the computer file.

Location and context metadata may be associated with a computer file in any suitable way, depending on the implementation. FIGS. 4-6 illustrate examples of ways in which location and context metadata may be associated with computer files. In FIG. 4, location and context metadata for computer files is stored in a table 400 maintained by the computer file system. As shown, table 400 includes references to multiple computer files 402A-402D. Computer file 402A is associated with two filetype-agnostic geographic locations 404A and 404B, having associated location contexts 406A and 406B. Computer file 402B only has one filetype-agnostic geographic location, 404C, along with a location context 406C. Computer file 402C is not associated with any filetype-agnostic geographic locations. Computer file 402D is associated with two filetype-agnostic geographic locations, 404D and 404E, although only geographic location 404D has an associated location context 406D. As discussed above, filetype-agnostic geographic locations lacking location contexts (e.g., geographic location 404E) may be interpreted as being a "default" or "generic" filetype-agnostic geographic location.

Table 400 may take any suitable form and may include location and context metadata for any or all of the computer files of the computing device. In some examples, table 400 may be implemented as a directory table of a file system. In cloud storage implementations in which the computer file system is at least partially distributed between one or more remote storage devices, the table may be locally maintained or remotely maintained as part of the cloud storage service.

In other examples, location and context information for a computer file may be stored in a separate file associated with the computer file. This is illustrated in FIG. 5, which shows a computer file 500 including file contents 502 stored in a folder 504 of a computer file system. Associated with file 500 is a separate computer file 506 including location and context metadata 508 for computer file 500. Separate file 506 may take any suitable form, and may in some examples be hidden from view. For example, in supported file systems, the separate file may be implemented as an inode. Furthermore, while FIG. 5 shows the separate file as being in the same folder (i.e., directory) as computer file 500, this need not be the case. In some implementations, File 506 may take the form of a wrapper for file 500.

Some computer file systems support extended file attributes, allowing computer files to be associated with metadata. Accordingly, in some cases, location and context metadata for a computer file may in some cases be specified by extended file attributes of the computer file. This is schematically shown in FIG. 6, which shows a computer file 600 having file contents 602. Computer file 600 also includes extended file attributes 604, specifying location and context metadata 606 for computer file 600.

FIGS. 4-6 are presented as examples and are not limiting. In other examples, location and context metadata may be associated with a computer file in other suitable ways, depending on the technical specifics of the computing device, file system, and computer file.

Figure 7:
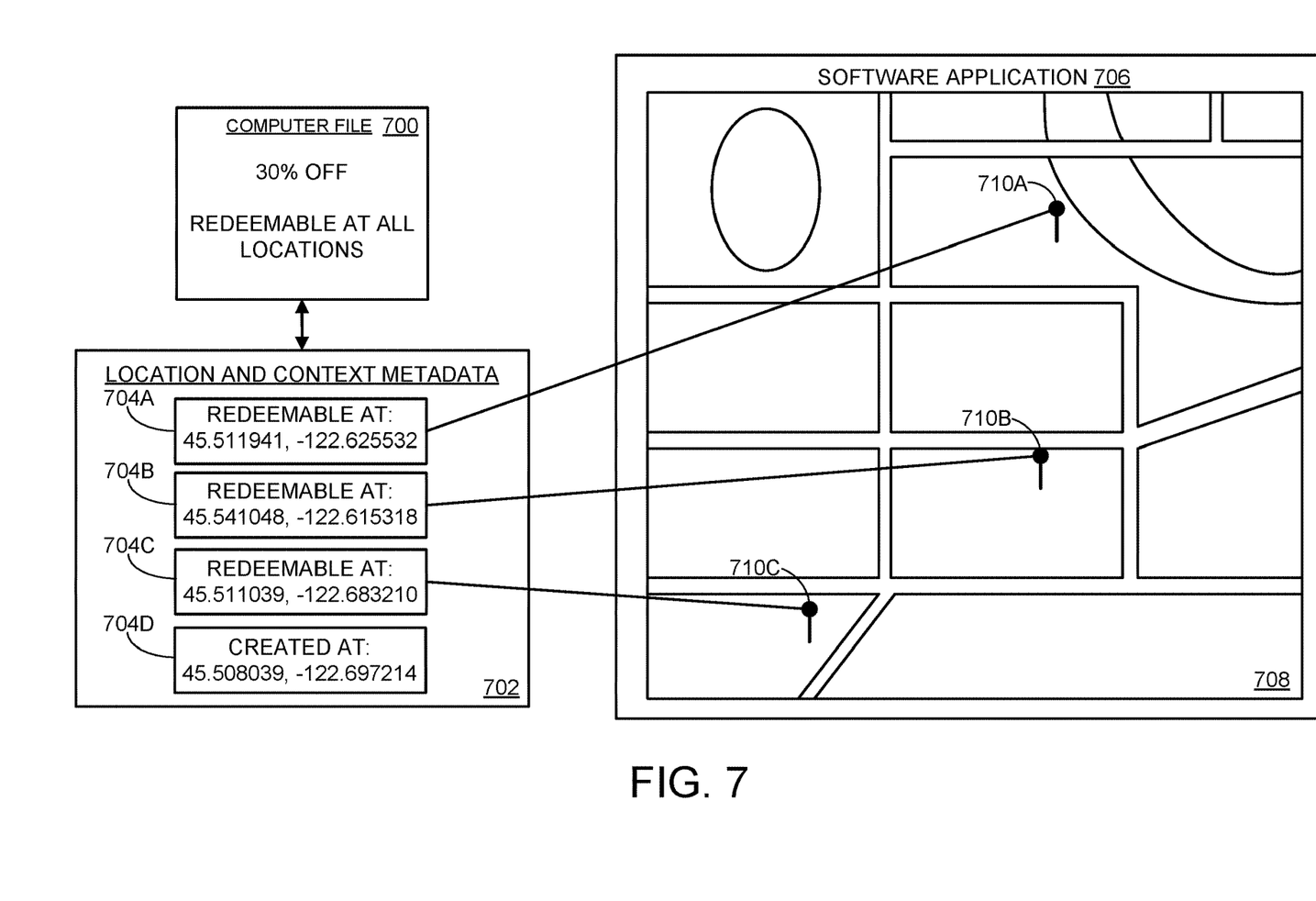
FIG. 7 schematically shows representation of filetype-agnostic geographic locations of a computer file on a digital map.

As discussed above, use of location and context metadata can enable new location-based functionality of a computing device. This is schematically illustrated in FIG. 7, which schematically shows another example computer file 700, taking the form of a coupon redeemable at multiple real-world locations. Location and context metadata 702 of computer file 700 includes four filetype-agnostic geographic locations 704A-704D. Geographic locations 704A-704C correspond to real-world locations at which the computer file is redeemable, while geographic location 704D corresponds to the real-world location at which the computer file was created.

FIG. 7 also schematically shows an example software application 706, including a GUI that includes a digital map 708. Computer file 700 is graphically represented on digital map at three map locations 710A-710C, corresponding to filetype-agnostic geographic locations 704A-704C. In other words, computer file 700 is represented at map locations at which it can be redeemed. This may be done, for example, after a user indicates that they would like to use the coupon. Thus, the locations at which the coupon is redeemable are currently relevant to the user's situation, while the location corresponding to the file's creation is not.

This situation—in which a computer file is graphically represented at some, but not all, of its associated filetype-agnostic geographic locations, may arise in other scenarios as well. For example, the computer file may correspond to a specific product, and may be graphically represented on the digital map only at filetype-agnostic geographic locations where the product is currently in stock. Similarly, a digital movie ticket may be represented at map locations corresponding to theaters where the ticket is accepted, and the theater is also playing a user's desired movie within an upcoming window of time. A person's contact entry may be represented at a map location corresponding to where the person can currently be found, as opposed to their home or work address. In general, filetype-agnostic geographic locations of a computer file may be filtered and selectively displayed in any suitable way, for example based on user prompt, the type of computer file, the software application being used to access the computer file, a current location of the computing device, a current time of day, etc.

Furthermore, a computer file may be accessed by a software application and represented on a GUI at any suitable time, and in response to any suitable trigger. In a typical example, a computer file will be accessed and graphically represented by a software application in response to user selection of the computer file, for example via tapping, double-clicking, dragging-and-dropping, etc. Additionally, or alternatively, computer files may be automatically accessed and graphically represented on a GUI under certain circumstances. For example, specific computer files may be graphically represented based on a user's to-do list, daily schedule, shopping list, current location, etc.

Figure 8:
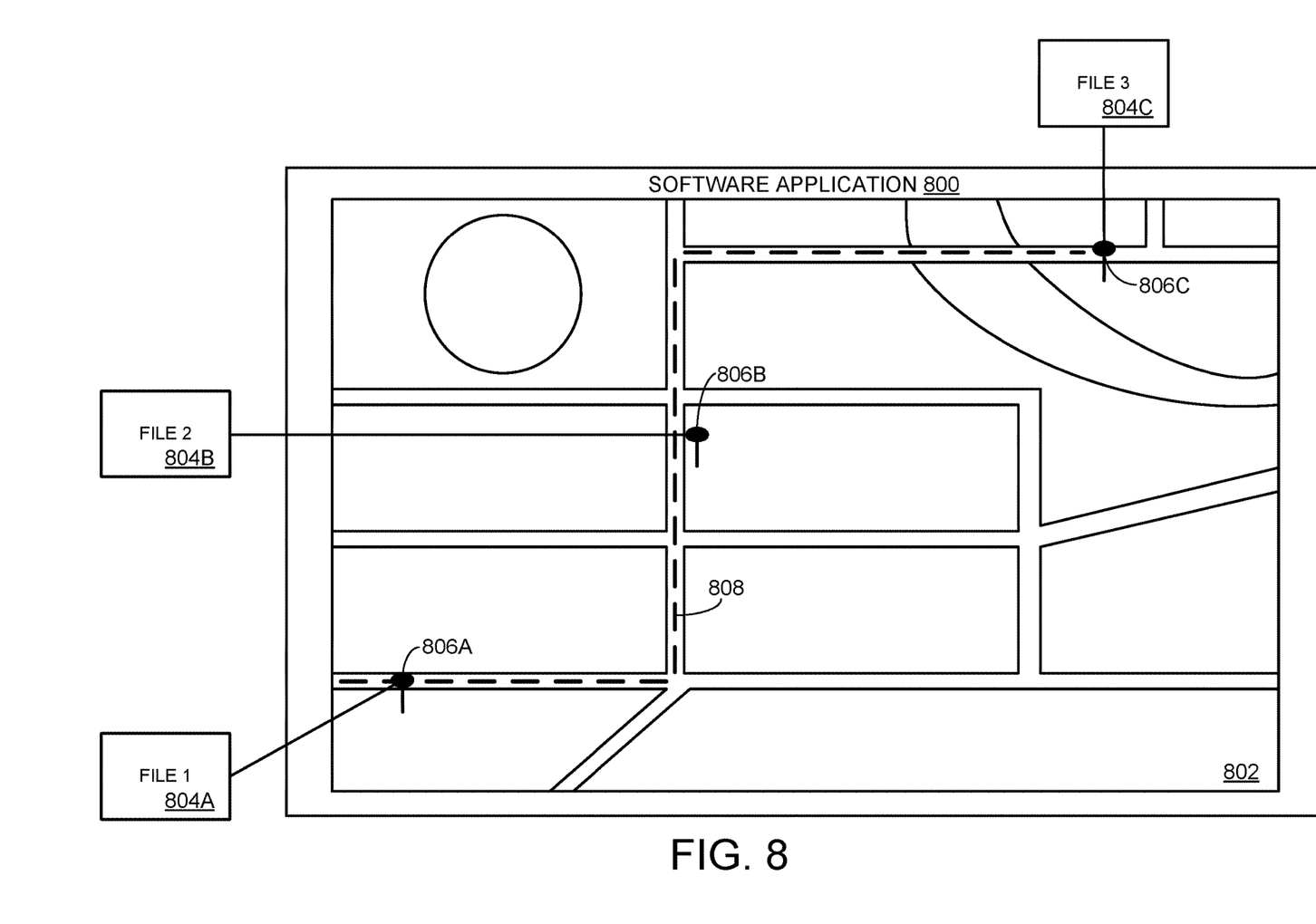
FIG. 8 schematically shows display of navigation directions between filetype-agnostic geographic locations of computer files.

While FIG. 7 only shows a single computer file being represented on a GUI, in other examples, multiple computer files may be represented at once, regardless of filetype. This is schematically illustrated in FIG. 8, which shows another example software application 800, with a GUI including a digital map 802. In this example, three different computer files 804A-804C are represented on the digital map at map locations 806A-806C. As discussed above, a location and context component of the software application may, for each of these computer files, retrieve filetype-agnostic geographic locations associated with the computer files via the location and context API, along with location contexts describing the filetype-agnostic geographic locations. Because each of the filetype-agnostic geographic locations have a shared predefined format, each of the computer files can be easily represented on the GUI at their associated geographic locations.

Furthermore, the software application may be configured to provide additional functionality upon graphically representing one or more computer files in a GUI. For example, the software application may be configured to provide a "memories" or "snapshot" feature, in which all of the computer files created or accessed during a period of time (e.g., a user's vacation) are graphically represented on the digital map at once. In this scenario, the user's digital boarding pass may be shown at the airport, the user's receipt from dinner is shown at the restaurant, photos are shown at the locations where they were taken, songs are shown at the locations where they were played, etc.

In a different scenario, the GUI component may be configured to graphically display navigation directions between any or all of the filetype-agnostic geographic locations associated with any computer files. For example, a user may identify multiple computer files corresponding to concert tickets, grocery coupons, contact entries, etc., and request that such computer files be graphically represented on the digital map. The software application may then automatically generate a route that the user can take to purchase their groceries, pick up their friends, and arrive at the concert venue. This is schematically shown in FIG. 8, in which a navigation route 808 is shown connecting the filetype-agnostic geographic locations corresponding to computer files 804A-804C. To further refine the navigation directions, in some cases, the software application may only show navigation directions for filetype-agnostic geographic locations within a threshold distance (e.g., 20 miles) from a current location of a user of the software application.

It will be understood that the above-described features are provided as examples. Because computers and computer files are used for a variety of purposes, software applications may be developed that leverage location and context information in ways not explicitly described herein. In other words, location and context metadata may be used to create a system-wide location platform. Applications developed to support this platform can make use of location and context information in myriad ways.

Figure 9:
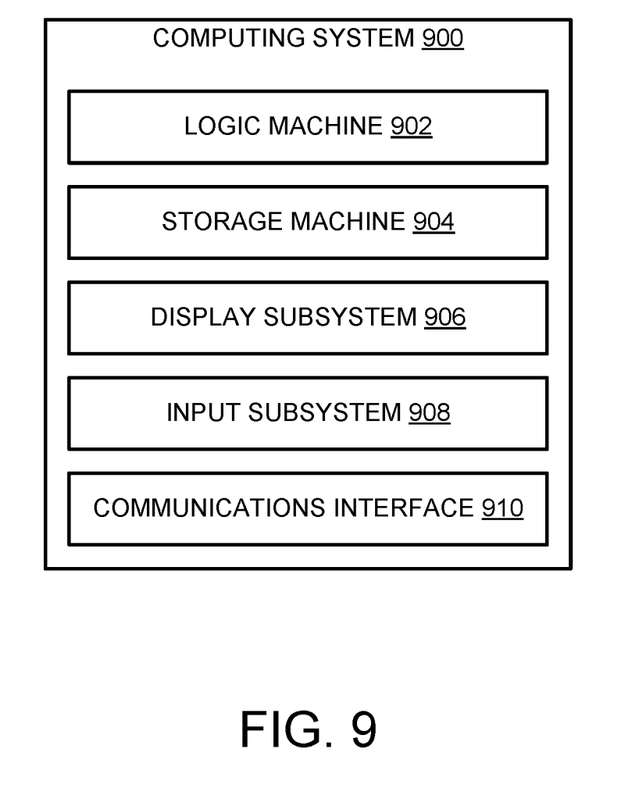
FIG. 9 schematically shows an example computing system.

FIG. 9 schematically shows a non-limiting embodiment of a computing system 900 that can implement the operating systems, file systems, and location and context API described above. Computing system 900 is shown in simplified form. Computing system 900 may take the form of one or more personal computers, server computers, tablet computers, home-entertainment computers, network computing devices, gaming devices, mobile computing devices, mobile communication devices (e.g., smart phone), and/or other computing devices.

Computing system 900 includes a logic machine 902 and a storage machine 904. Computing system 900 may optionally include a display subsystem 906, input subsystem 908, communication subsystem 910, and/or other components not shown in FIG. 9.

Logic machine 902 includes one or more physical devices configured to execute instructions. For example, the logic machine may be configured to execute instructions that are part of one or more applications, services, programs, routines, libraries, objects, components, data structures, or other logical constructs. Such instructions may be implemented to perform a task, implement a data type, transform the state of one or more components, achieve a technical effect, or otherwise arrive at a desired result.

The logic machine may include one or more processors configured to execute software instructions. Additionally or alternatively, the logic machine may include one or more hardware or firmware logic machines configured to execute hardware or firmware instructions. Processors of the logic machine may be single-core or multi-core, and the instructions executed thereon may be configured for sequential, parallel, and/or distributed processing. Individual components of the logic machine optionally may be distributed among two or more separate devices, which may be remotely located and/or configured for coordinated processing. Aspects of the logic machine may be virtualized and executed by remotely accessible, networked computing devices configured in a cloud-computing configuration.

Storage machine 904 includes one or more physical devices configured to hold instructions executable by the logic machine to implement the methods and processes described herein. When such methods and processes are implemented, the state of storage machine 904 may be transformed—e.g., to hold different data.

Storage machine 904 may include removable and/or built-in devices. Storage machine 904 may include optical memory (e.g., CD, DVD, HD-DVD, Blu-Ray Disc, etc.), semiconductor memory (e.g., RAM, EPROM, EEPROM, etc.), and/or magnetic memory (e.g., hard-disk drive, floppy-disk drive, tape drive, MRAM, etc.), among others. Storage machine 904 may include volatile, nonvolatile, dynamic, static, read/write, read-only, random-access, sequential-access, location-addressable, file-addressable, and/or content-addressable devices.

It will be appreciated that storage machine 904 includes one or more physical devices. However, aspects of the instructions described herein alternatively may be propagated by a communication medium (e.g., an electromagnetic signal, an optical signal, etc.) that is not held by a physical device for a finite duration.

Aspects of logic machine 902 and storage machine 904 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

When included, display subsystem 906 may be used to present a visual representation of data held by storage machine 904. This visual representation may take the form of a graphical user interface (GUI). As the herein described methods and processes change the data held by the storage machine, and thus transform the state of the storage machine, the state of display subsystem 906 may likewise be transformed to visually represent changes in the underlying data. Display subsystem 906 may include one or more display devices utilizing virtually any type of technology. Such display devices may be combined with logic machine 902 and/or storage machine 904 in a shared enclosure, or such display devices may be peripheral display devices.

When included, input subsystem 908 may comprise or interface with one or more user-input devices such as a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity.

When included, communication subsystem 910 may be configured to communicatively couple computing system 900 with one or more other computing devices. Communication subsystem 910 may include wired and/or wireless communication devices compatible with one or more different communication protocols. As non-limiting examples, the communication subsystem may be configured for communication via a wireless telephone network, or a wired or wireless local- or wide-area network. In some embodiments, the communication subsystem may allow computing system 900 to send and/or receive messages to and/or from other devices via a network such as the Internet.

In an example a computer file system of a computing device includes a storage manager configured to allocate data storage space of the computing device for a plurality of computer files having different filetypes. The computer file system also includes a location and context application programming interface (API) configured to associate location and context metadata with any of the plurality of computer files regardless of filetype. The location and context metadata includes, for a computer file: one or more filetype-agnostic geographic locations associated with the computer file, each of the one or more filetype-agnostic geographic locations having a shared predefined format assigned by the location and context API; and for each of the one or more filetype-agnostic geographic locations associated with the computer file, a location context describing a relationship between the filetype-agnostic geographic location and the computer file. In this example or other examples, the location and context metadata for the computer file is stored in a table maintained by the computer file system. In this example or other examples, the location and context metadata for the computer file is stored in a separate file associated with the computer file. In this example or other examples, the location and context metadata for the computer file further includes annotation information specifying how the computer file is to be graphically represented on a digital map. In this example or other examples, the computer file system is configured to provide a software application access to the computer file and report the one or more filetype-agnostic geographic locations to the software application. In this example or other examples, the shared predefined format of the one or more filetype-agnostic geographic locations is useable by a software application to graphically represent the computer file at the one or more filetype-agnostic geographic locations on a digital map. In this example or other examples, the computer file system supports extended file attributes, and the location and context metadata for the computer file is specified by extended file attributes of the computer file. In this example or other examples, the computer file is a digital audio file. In this example or other examples, the computer file is a text document. In this example or other examples, the computer file is a contact entry representing a person.

In another example, a software application includes a file system access component configured to access from a computer file system at least a first computer file having a first filetype and a second computer file having a second filetype, different than the first filetype. The software application also includes a location and context component configured to retrieve, via a location and context application programming interface (API) of the computer file system, one or more filetype-agnostic geographic locations associated with the first computer file and, for each of the one or more filetype-agnostic geographic locations associated with the first computer file, a location context describing a relationship between the filetype-agnostic geographic location and the first computer file, each of the one or more filetype-agnostic geographic locations associated with the first computer file having a shared predefined format. The location and context component is configured to retrieve, via the location and context API of the computer file system, one or more filetype-agnostic geographic locations associated with the second computer file and, for each of the one or more filetype-agnostic geographic locations associated with the second computer file, a location context describing a relationship between the filetype-agnostic geographic location and the second computer file, each of the one or more filetype-agnostic geographic locations associated with the second computer file having the shared predefined format. The application also includes a graphical user interface (GUI) component configured to graphically represent the first computer file and the second computer file on a GUI based on the one or more filetype-agnostic geographic locations associated with the first and second computer files and the location contexts associated with the filetype-agnostic geographic locations. In this example or other examples, the location and context component further retrieves, from the computer file system via the location and context API, annotation information for the first and second computer files specifying how the first and second computer files are graphically represented on the GUI. In this example or other examples, the location and context component is further configured to, via the location and context API, modify the filetype-agnostic geographic locations associated with the first computer file. In this example or other examples, modifying the filetype-agnostic geographic locations associated with the first computer file includes associating an additional filetype-agnostic geographic location with the first computer file. In this example or other examples, the additional filetype-agnostic geographic location associated with the first computer file corresponds to a real-world location at which the first computer file was accessed. In this example or other examples, the first computer file is redeemable for a product or service at a real-world location, and a filetype-agnostic geographic location associated with the first computer file corresponds to the real-world location. In this example or other examples, the GUI is a digital map, and the first and second computer files are represented at positions on the digital map corresponding to the filetype-agnostic geographic locations associated with the first and second computer files. In this example or other examples, the GUI component is further configured to graphically display navigation directions between any or all of the filetype-agnostic geographic locations associated with the first and second computer files. In this example or other examples, navigation directions are only shown for filetype-agnostic geographic locations within a threshold distance from a current location of a user of the software application.

In another example, a computing device includes a logic machine and a storage machine holding instructions executable by the logic machine. When executed the instructions allocate data storage space of the storage machine for a plurality of computer files having different filetypes and associate location and context metadata with any of the plurality of computer files regardless of filetype. The location and context metadata includes, for a computer file: one or more filetype-agnostic geographic locations associated with the computer file, each of the one or more filetype-agnostic geographic locations having a shared predefined format assigned by the location and context API; and for each of the one or more filetype-agnostic geographic locations associated with the computer file, a location context describing a relationship between the filetype-agnostic geographic location and the computer file.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A computer file system of a computing device, comprising:
   a storage manager to allocate data storage space of the computing device for a plurality of computer files having different filetypes; and
   a location and context application programming interface (API) to associate location and context metadata with any of the plurality of computer files regardless of filetype, the location and context metadata including, for at least a first computer file having a first filetype and a second computer file having a second, different filetype:
      one or more filetype-agnostic geographic locations each having a shared predefined format assigned by the location and context API; and
      for each of the one or more filetype-agnostic geographic locations, a location context describing a relationship between each of the filetype-agnostic geographic locations and its corresponding computer file of the first and second computer files; and
      where the computing device includes a graphical user interface (GUI) component to graphically represent the first computer file and the second computer file on a GUI based on the one or more filetype-agnostic geographic locations associated with the first and second computer files and the location contexts associated with the filetype-agnostic geographic locations.

2. The computer file system of claim 1, where the location and context metadata for the first and second computer files is stored in a table maintained by the computer file system.

3. The computer file system of claim 1, where the location and context metadata for the first and second computer files is stored in first and second separate files associated with the first and second computer files.

4. The computer file system of claim 1, where the location and context metadata for the first and second computer files further includes annotation information specifying how the first and second computer files are to be graphically represented on the GUI, the GUI including a digital map.

5. The computer file system of claim 1, where the computer file system provides a software application access to the first and second computer files and reports the one or more filetype-agnostic geographic locations to the software application.

6. The computer file system of claim 1, where the shared predefined format of the one or more filetype-agnostic geographic locations is useable by a software application to graphically represent the first and second computer files at the one or more filetype-agnostic geographic locations on the GUI, the GUI including a digital map.

7. The computer file system of claim 1, where the computer file system supports extended file attributes, and the location and context metadata for the first and second computer files is specified by extended file attributes of the first and second computer files.

8. The computer file system of claim 1, where the first computer file is a digital audio file.

9. The computer file system of claim 1, where the first computer file is a text document.

10. The computer file system of claim 1, where the first computer file is a contact entry representing a person.

11. A software application, comprising:
a file system access component to access from a computer file system at least a first computer file having a first filetype and a second computer file having a second filetype, different than the first filetype;
a location and context component to retrieve, via a location and context application programming interface (API) of the computer file system, one or more filetype-agnostic geographic locations associated with the first computer file and, for each of the one or more filetype-agnostic geographic locations associated with the first computer file, a location context describing a relationship between the filetype-agnostic geographic location and the first computer file, each of the one or more filetype-agnostic geographic locations associated with the first computer file having a shared predefined format;
the location and context component to retrieve, via the location and context API of the computer file system, one or more filetype-agnostic geographic locations associated with the second computer file and, for each of the one or more filetype-agnostic geographic locations associated with the second computer file, a location context describing a relationship between the filetype-agnostic geographic location and the second computer file, each of the one or more filetype-agnostic geographic locations associated with the second computer file having the shared predefined format; and
a graphical user interface (GUI) component to graphically represent the first computer file and the second computer file on a GUI based on the one or more filetype-agnostic geographic locations associated with the first and second computer files and the location contexts associated with the filetype-agnostic geographic locations.

12. The software application of claim 11, where the location and context component further retrieves, from the computer file system via the location and context API, annotation information for the first and second computer files specifying how the first and second computer files are graphically represented on the GUI.

13. The software application of claim 11, where the location and context component further modifies, via the location and context API, the filetype-agnostic geographic locations associated with the first computer file.

14. The software application of claim 13, where modifying the filetype-agnostic geographic locations associated with the first computer file includes associating an additional filetype-agnostic geographic location with the first computer file.

15. The software application of claim 14, where the additional filetype-agnostic geographic location associated with the first computer file corresponds to a real-world location at which the first computer file was accessed.

16. The software application of claim 11, where the first computer file is redeemable for a product or service at a real-world location, and a filetype-agnostic geographic location associated with the first computer file corresponds to the real-world location.

17. The software application of claim 11, where the GUI is a digital map, and the first and second computer files are represented at positions on the digital map corresponding to the filetype-agnostic geographic locations associated with the first and second computer files.

18. The software application of claim 11, where the GUI component graphically displays navigation directions between any or all of the filetype-agnostic geographic locations associated with the first and second computer files.

19. The software application of claim 18, where navigation directions are only shown for filetype-agnostic geographic locations within a threshold distance from a current location of a user of the software application.

20. A computing device, comprising:
a logic machine; and
a storage machine holding instructions executable by the logic machine to:
allocate data storage space of the storage machine for a plurality of computer files having different filetypes;
associate location and context metadata with any of the plurality of computer files regardless of filetype, the location and context metadata including, for at least a first computer file having a first filetype and a second computer file having a second, different filetype:
one or more filetype-agnostic geographic locations each having a shared predefined format assigned by the location and context API; and
for each of the one or more filetype-agnostic geographic locations, a location context describing a relationship between each of the filetype-agnostic geographic locations and its corresponding computer file of the first and second computer files; and
graphically represent the first computer file and the second computer file on a graphical user interface (GUI) based on the one or more filetype-agnostic geographic locations associated with the first and second computer files and the location contexts associated with the filetype-agnostic geographic locations.

* * * * *